United States Patent Office 3,027,248
Patented Mar. 27, 1962

3,027,248
PREPARATION FOR INFLUENCING THE GROWTH OF PLANTS
Harmannus Koopman and Jasper Daams, Van Houtenlaan, Weesp, Netherlands, assignors to North American Philips Company, Inc., New York, N.Y., a corporation of Delaware
No Drawing. Filed Nov. 4, 1958, Ser. No. 771,742
Claims priority, application Netherlands Nov. 5, 1957
13 Claims. (Cl. 71—2.3)

It has been found that a group of derivatives of benzonitrile is capable of influencing the growth of plants.

The present invention relates to a method of producing preparations for influencing the growth of plants, and is characterized in that a compound of the general formula:

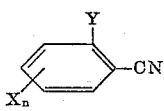

in which Y represents a halogen atom, an alkyl group with 1 to 5 carbon atoms and preferably a methyl group or a nitro group, and X represents a halogen atom, an alkyl group with 1 to 5 carbon atoms and preferably a methyl group or a nitro group, and $n$ may be 0 to 4 if both X and Y are halogen atoms, and $n$ may be 0, 1 or 2 if at least one alkyl group or at least one nitro group is linked to the benzene ring, or $X_n$ represents a combination of said groups, is mixed with or dissolved in inert solid or liquid carrier materials, if desired with the addition of surface-active materials, dispersion agents and/or adhesives.

Chlorine enters particularly into account as a halogen, while particularly methyl groups and ethyl groups are interesting as alkyl groups.

The researches leading to the invention have shown that for the activity of the compounds according to the invention it is particularly of importance that a chlorine atom, an alkyl group with 1 to 5 carbon atoms and in particular a methyl group or a nitro group is attached at the benzene nucle at at least one ortho-position with respect to the nitrile groups. Further it has been found that occupation of the other ortho-position by any of these groups may be beneficial to the activity of the compound. This applies in particular to compounds in which this position is occupied by a chlorine atom, a methyl group or an ethyl group.

The following materials enter inter alia into account as effective compounds for use in preparation according to the invention:

2-chloro-, 2-methyl-, 2-ethyl- and 2-nitrobenzonitrile; 2.4-dichloro-, 2.5-dichloro- and 2.6-dichlorobenzonitrile; 2.6-dimethyl- and 2.6-diethylbenzonitrile (boiling point 111° C./114° C. at 12 mms. mercury) pressure; 2.4.6-trichloro and 2.4.5-trichlorobenzonitrile; 2-chloro-6-methyl-; 2-chloro-5-nitro- and 2-methyl-5-nitrobenzonitrile; 2.3.5.6-tetrachlorobenzonitrile.

Of particular importance are 2.6-dichloro-benzonitrile, 2-chloro-6-methylbenzonitrile and 2.4.6-trichlorobenzonitrile.

Of the compounds not earlier described in the literature a physical constant is mentioned.

The preparations according to the invention are capable of controlling germination of seeds and tubers. It is suitable for combating or controlling premature germination of seeds and tubers and in particular of premature sprouting of potatoes.

As effective compounds those are in particular of importance, in which only one ortho-position is occupied by a chlorine atom, a methyl group or a nitro group and further those in which moreover the other ortho-position or this position and the para-position are occupied by a chlorine atom.

2.6-dichlorobenzonitrile and 2.4.6-trichlorobenzonitrile were found to have a strong growth-controlling effect with regard to germs and germ plants of Monocotyledones and Dicotyledones and of young Monocotyledones and potato sprouts. In particular, the great activity of 2,6-dichlorobenzonitrile was manifest.

Thus it has been found that the germination of seeds of cress and millet is greatly retarded by the following compounds: 2-methylbenzonitrile; 2-chlorobenzonitrile; 2-nitrobenzonitrile; 2-methyl-6-chlorobenzonitrile and in particular 2.6-dichlorobenzonitrile and 2.4.6-trichlorobenzonitrile. A similar action have 2.4-dichlorobenzonitrile, 2-chloro-5-nitrobenzonitrile and 2-methyl-5-nitrobenzonitrile.

It has further been found that the sprouting of potatoes is checked by a number of compounds according to the invention. A strong controlling effect has, for example 2-chlorobenzonitrile and 2-methyl-5-nitrobenzonitrile, while 2.6-dichlorobenzonitrile and 2.4.6-trichlorobenzonitrile completely suppress the sprouting of potatoes when administering practicable dosages.

When using 2.4.6-trichlorobenzonitrile for seed potatoes it has been found that premature germination is completely prevented, while the germinative faculty of these potatoes is not detracted from.

Quantities of 2 to 20 gms. of 2.4.6-trichlorobenzonitrile per 100 kg. of potatoes yield satisfactory results, while even a quantity of 5 to 10 gms. yields excellent results.

The preparations according to the invention further have in particular a growth-controlling action with regard to Monocotyledones.

It is suitable for combating monocotyledonous weed and in particular wild oats (*Avena fatua*) and of quackgrass (*Agropyron repens*).

Of the compounds according to the invention particularly those have a growth controlling effect on Monocotyledones, in which a chlorine atom or a methyl group is linked only at one ortho-position with regard to the nitrile group, and further those in which moreover a chlorine atom is linked at the other orthoposition or at this position and the para-position. Thus, it has been found that 2-methylbenzonitrile, 2-chloro-benzonitrile and 2.4.6-trichlorobenzonitrile and in particular 2.6-dichlorobenzonitrile and 2 - chloro - methylbenzonitrile have a strong growth-controlling effect with regard to Monocotyledones, for example oats (*Avena sativa*). Tests with 2-chloro-6-mehylbenzonitrile revealed that in particular this compound has a particularly strong growth-controlling effect of oats (*Avena sativa*), wild oats (*Avena fatua*) and quack grass (*Agropyron repens*).

The influence of a number of compounds on the germination of seeds of cress (*Lepidium sativum*) and millet (*Panicum miliaceum*) was determined as follows:

5 ccs. of a solution of 0.01% of the active compound in acetone on a piece of filter paper approximately 9 cms. in diameter were introduced into a Petri dish. After evaporation of the acetone the paper was wetted with 5 ccs. of water. Subsequently, 25 seeds of cress or millet were spread out on the paper. The seeds of cress were allowed to germinate at 20° C. in an incubator, those of millet at 24° C. both for 48 hours.

The checking of the germination was determined by counting the non-germinated seeds. For each test the number of non-germinated seeds was expressed as a percentage of the sum total of the seeds. In a control test, the germination of untreated seeds was investigated.

Notation of the test results:

No germination ++; 90% to 10% germination-retardation +; 20% to 90% germination-retardation ±; germination equal to that of untreated seeds —.

The results of the tests are listed in Table I.

Table I

| Compound | Cress | Millet |
|---|---|---|
| 2-nitrobenzonitrile | ++ | + |
| 2-methylbenzonitrile | + | + |
| 2-chlorobenzonitrile | + | + |
| 2.6-dicholrobenzonitrile | + | ++ |
| 2.4-dichlorobenzonitrile | + | + |
| 2.5-dichlorobenzonitrile | ± | ± |
| 2.4.6-trichlorobenzonitrile | + | + |
| 2-chloro-6-methylbenzonitrile | + | + |
| 2-chloro-5-nitrobenzonitrile | + | + |
| 2-methyl-5-nitrobenzonitrile | + | + |

The germination-control of potatoes was determined as follows.

Powders containing 5% of effective compound were produced with talcum as a carrier. The powder was dusted over the potatoes. Two gms. of powder were used per kg. of potatoes, which corresponds to a dosage of 10 gms. of effective compound per 100 kg. of potatoes.

The treated potatoes were stored in paper bags from November 15 to April 1 at a temperature of 8° C. to 14° C. Each test was carried out in threefold. After the test, the weight of the germs per kg. of potatoes was determined. The results are listed in Table II.

Table II

| Compound | Weight of the germs | | | |
|---|---|---|---|---|
| | Test 1 | Test 2 | Test 3 | Sum total of three tests |
| 2-chlorobenzonitrile | 11.5 | 3 | 15.5 | 30 |
| 2.6-dichlorobenzonitrile | 0 | 0 | 0 | 0 |
| 2.4.6-trichlorobenzonitrile | 0 | 0 | 0 | 0 |
| untreated | 64 | 32 | 46 | 142 |

The influence exerted on the growth of Monocotyledones by a number of compounds was investigated with oats (*Avena sativa*). The tests were effected as follows.

The earth of a number of pots each containing approximately 15 newly germinated plants of oats (*Avena sativa*) approximately 6 cms. tall were sprinkled with an aqueous suspension of the test compound. In this manner, a quantity of 25 mgs. of the compound, each time suspended in 25 ccs. of water, was administered per pot, which corresponds to a dosage of 40 kgs. per hectare. The tests were carried out in threefold. After ten days the "fresh weight" of the overground parts of the plants were determined per pot and expressed as a percentage of the "fresh weight" of untreated plants.

The results of these tests are listed in Table III.

Table III

| Compound | "Fresh weight" of overground parts of treated plants relative to that of untreated plants (in percent) |
|---|---|
| 2-methylbenzonitrile | 45 |
| 2-chlorobenzonitrile | 7 |
| 2-methyl-6-chlorobenzonitrile | 0 |
| 2.6-dichlorobenzonitrile | 0 |
| 2.4.6-trichlorobenzonitrile | 10 |

The influence of 2-chloro-6-methylbenzonitrile on the growth of wild oats (*Avena fatua*), oats (*Avena sativa*) and quack grass (*Agropyron repens*) was investigated by tests, similarly as described above with regard to oats, in quantities of 1, 3, 10 and 30 mgs. per pot, which corresponds to dosages of 1.6, 4.8, 16 kg. and 48 kg. respectively of 2-chloro-6-methylbenzonitrile per hectare. In carrying out these tests seeds of oats and wild oats, and root-stocks of quack grass were introduced into the earth of the pots. After 21 days the plants were assessed. The result is listed in Table IV.

Table IV

| Dosage of 2-chloro-6-methyl benzonitrile in mg. per pot | Assessment of the growth of plants | | |
|---|---|---|---|
| | Oats | wildoats | quackgrass |
| 30 | killed | killed | killed. |
| 10 | do | do | Do. |
| 3 | do | high mortality | high mortality. |
| 1 | strongly retarded. | retarded | not retarded. |

From this table it is seen that for combating wild oats and quack grass a dosage corresponding to 5 to 10 kg. of 2-chloro-6-methylbenzonitrile per hectare may be sufficient.

Similar tests as described before with regard to 2-chloro-6-methylbenzonitrile were carried out with 2.6-dichlorobenzonitrile. The results are listed in Table V.

Table V

| Dosage of 2.6-dichlorobenzonitrile in mg. per pot | Assessment of plant growth | | |
|---|---|---|---|
| | Oats | Wild oats | Quack grass |
| 30 | killed | killed | killed. |
| 10 | do | do | Do. |
| 3 | do | do | Do. |
| 1 | do | do | retarded. |
| 0.3 | | do | |
| 0.1 | | retarded | |

From these results it can be seen that 2.6-dichlorobenzonitrile even in very small quantities can be an important means for combating Monocotyledones and, in particular, wild oats.

This was confirmed by field tests. Moreover, these tests showed that with "pre-emergency" use it is also possible to combat dicotyle weeds, such as for example, chickweed, cleavers and bindweed. It is to be noted that the dicotyle weeds expressly referred to can not be combated or only with difficulty by the conventional chlorophenoxy-acetic acids.

Surprisingly, it has been found that 2.4.5-trichlorobenzonitrile has a stimulating effect on plant growth, in particular on the growth of young plants. This growth-stimulation particularly occurs when administering it to Monocotyledones and, in particular, young oat plants (*Avena sativa*).

An idea of the growth-promoting effect of 2.4.5-trichlorobenzonitrile is gained from Table VI stating the effect on the growth of young plants of common oats (*Avena sativa*).

The growth-stimulating effect of 2.4.5-trichlorobenzonitrile was determined in the same manner as that used for investigating the influence of the compounds listed in Table III on the growth of common oats. In carrying out the tests, a concentration series of the effective substance was used corresponding to dosages of 1.6; 4.8; 16 and 48 kg. per hectare respectively.

Table VI

| Dosage in kg. per hectare | "fresh weight" overground parts of treated plants with regard to that of untreated plants (in percent) |
|---|---|
| 1.6 | 102 |
| 4.8 | 144 |
| 16 | 134 |
| 48 | 159 |

The effective compounds may be processed in several different ways to products ready for use. Possible forms are:

(a) Wettable powders with 25% to 80%, say 50%, of active material and in addition wetting agents, for example fat alcohol sulfates or alkylarylsulfonates, and dispersion agents such as lignin sulfonate and carriers, for example kaolin, chalk, pipe clay, magnesium marlstone and attapulgite, (b) Miscible oils with 5% to 30% and preferably 5 to 10% of active constituent, 5% to 10% of ionogenous or non-ionogenous emulgator or mixtures thereof, rest solvents (essentially aromatic hydrocarbons, for example benzene, toluene or xylene, mixed with aliphatic or aromatic ketones such as acetone and cyclohexanone), (c) Dusts containing 1% to 20%, say 5%, of active substance in a mixture of kieselguhr and magnesium marlstone and, if desired wetting agents, (d) Solutions of the active material in organic solvents, for example aromatic hydrocarbons or aliphatic or aromatic ketones or mixtures of them.

As a preparation for combating or controlling premature sprouting of potatoes a dust is preferably used, which contains 1% to 20% and preferably 2% to 5% of active substance and in addition talc, kieselguhr or magnesium marlstone or a mixture of them.

The following example is given:
4% of 2.4.6-trichlorobenzonitrile or 2.6-dichlorobenzonitrile with 16% of kieselguhr and 80% of magnesium marlstone.

In order to prevent premature germination of stored potatoes they may be treated by dusting them with a dust of the kind referred to above.

A suitable composition of a mixable oil with 2-chloro-6-methylbenzonitrile as active constituent is, for example:

25% of 2-chloro-6-methylbenzonitrile
8% of polyoxyethylene-sorbitol mono-oleate
6% of methylethylketone
61% of xylene A suitable composition of a mixable oil with 2.6-dichlorobenzonitrile as an active constituent is, for example:

5 parts by weight of 2.6-dichlorobenzonitrile
5 parts by weight of emulsifying agent (alkylarylsulphonate and alkylphenolpolyglycolether) and
90 parts by weight of xylene Besides xylene, toluene is a particularly suitable solvent.

The compounds according to the invention and the methods of producing them have nearly all been described. See for example the article by H. H. Hodgson et al. starting on page 1131 of the Journal of Organic Chemistry (1949) and P. Karrer, "Organic Chemistry," page 435 (1938 ed.). For producing compounds according to the invention so far not described there may be proceeded similarly.

What is claimed is:

1. A method of controlling the growth of plants and germination of seeds which comprises bringing into contact with said plants and seeds, in an amount sufficient to control the growth of said plants and the germination of said seeds, a chlorinated benzonitrile substituted on the nucleus only with from 1 to 4 chlorine atoms, one of said chlorine atoms being ortho to the cyano group.

2. A method of controlling the growth of plants and germination of seeds which comprises bringing into contact with said plants and seeds, in an amount sufficient to control the growth of said plants and the germination of said seeds, a chlorinated benzonitrile substituted on the nucleus with from 1 to 2 chlorine atoms and a methyl group, at least one of said chlorine atoms being ortho to the cyano group.

3. A method of controlling the growth of plants and germination of seeds which comprises bringing into contact with said plants and seeds, in an amount sufficient to control the growth of said plants and the germination of said seeds, 2,6-dichlorobenzonitrile.

4. A method of controlling the growth of plants and germination of seeds which comprises bringing into contact with said plants and seeds, in an amount sufficient to control the growth of said plants and the germination of said seeds, 2-chloro-6-methylbenzonitrile.

5. A method of controlling the growth of plants and germination of seeds which comprises bringing into contact with said plants and seeds, in an amount sufficient to control the growth of said plants and the germination of said seeds, 2,4,6-trichlorobenzonitrile.

6. A method of controlling the growth of plants and germination of seeds which comprises bringing into contact with said plants and seeds, in an amount sufficient to control the growth of said plants and the germination of said seeds, 2,4,5-trichlorobenzonitrile.

7. A method of controlling the growth of plants and germination of seeds which comprises bringing into contact with said plants and seeds, in an amount sufficient to control the growth of said plants and the germination of said seeds, 2-chlorobenzonitrile.

8. A method of treating potatoes to prevent premature sprouting comprising treating about 100 kgs. of said potatoes with from about 2 to 20 gms. of 2,6-dichlorobenzonitrile.

9. A method of treating potatoes to prevent premature sprouting comprising treating about 100 kgs. of said potatoes with from about 2 to 20 gms. of 2,4,6-dichlorobenzonitrile.

10. A method of destroying weeds comprising treating said weeds with from about 1 to 5 kgs. of 2,6-dichlorobenzonitrile per hectare.

11. A method of destroying weeds comprising treating said weeds with about 5 kgs. to 10 kgs. per hectare of 2-chloro-6-methylbenzonitrile.

12. A method of stimulating the growth of monocotyledones comprising treating said monocotyledones with from about 0.5 to 10 kgs. of 2,4,5-trichlorobenzonitrile per hectare.

13. A method of controlling the growth of plants and germination of seeds which comprises bringing into contact with said plants and seeds, in an amount sufficient to control the growth of said plants and the germination of said seeds a substituted benzonitrile of the structural formula

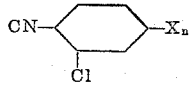

wherein X represents a substituent selected from the group consisting of chlorine and alkyl containing from 1 to 5 carbon atoms and $n$ represents an integer from 0 to 3 when X represents chlorine and $n$ represents an integer not greater than 1 when X represents allyl.

References Cited in the file of this patent

"Plant Regulators," pages a, b, c, 1 and 22, CBBC Positive Data Series, No. 2, June 1955, National Research Council, Washington, D.C.

Thompson et al. in "Botanical Gazette," vol. 107, pages 475–507 (1946).

Weintraub et al. in "Botanical Gazette," March 1952, pages 348–362.

King: U.S. Dept. of Agric. Handbook No. 69, issued May 1954, p. 79.